(12) United States Patent
Nagle

(10) Patent No.: X4289
(45) Date of Patent: Dec. 14, 1825

(54) BOOTS & SHOES, WATER PROOF

(76) Inventor: Patrick G. Nagle

Patricks G. Nagle: a citizen of the United States
Improvement in the [illegible]
ture of Boots and Shoes and
in the preparation and com
position of the materials for
their manufacture to render
them impervious to water
Dat. of Patent [illegible] 182.
[illegible]

The schedule referred to in these Letters Patent & making part of the same containing a description in the words of the said Patrick G. Nagle himself of his improvement in the manufacture of Boots and Shoes and in the preparation and composition of the materials for their manufacture to render them impervious to water.

The following are the materials used, and the mode of using them, to make boots and shoes completely impervious to water: Take two quarts of Linseed Oil 2 lbs of mutton suet 2 lbs of Beeswax 1 lb of Rosin, and 1 pint of [illegible]; put them all together into a large earthen vessel and let the mixture boil for about two minutes, then take them off the fire and let it remain in the vessel until it becomes milk warm.

In that state apply it to [illegible] skin to make the upper leathers, when cut and about to be stretched on the crimping boards in order that it may penetrate every part of the leather [illegible]. Take about [illegible] of the

[illegible] and rub it well with the [illegible]
paste [illegible] silk, then double the silk,
and apply it between the upper leather and
the lining [illegible] the part of the boot or [illegible] upon
the instep [illegible] the silk thus prepared to be pla-
ced between the upper leather and lining
of the shoe. For making the [illegible]
[illegible]
[illegible] the paste [illegible] when it
[illegible] the whole size
of the part between the two leathers [illegible]
[illegible] with the prepared [illegible] to cover the
[illegible] on the [illegible]

Patrick [illegible] Nagle

Witness
[illegible]
[illegible] Fielding

DRAFTSMAN'S DIVISION.

*All communications should be addressed to "The Commissioner of Patents, Washington, D. C."*

2—328 *a.*

*DEPARTMENT OF THE INTERIOR,*

United States Patent Office,

*Washington, D. C.,* ........................ , *189*...

*SIR:*

*The printed* copies *of Patent No.* P G Nagle are *exhausted.* Dec 14 1825

*As soon as printed a copy will be mailed you to complete your order.*

*By direction of the Commissioner:*

*Very respectfully,*

*Chief Clerk.*

3143b6-97-5m